US005267742A

United States Patent [19]

Reinkemeyer

[11] Patent Number: 5,267,742

[45] Date of Patent: Dec. 7, 1993

[54] SHOCK MOUNT FOR DOORS

[75] Inventor: Robert W. Reinkemeyer, Wentzville, Mo.

[73] Assignee: Seco Products Corporation, Washington, Mo.

[21] Appl. No.: 843,410

[22] Filed: Feb. 28, 1992

[51] Int. Cl.[5] .............................................. B62B 1/00

[52] U.S. Cl. .................................... 280/79.3; 49/388; 49/394; 312/326; 16/361

[58] Field of Search ........................... 280/79.11, 79.3; 49/388, 394; 312/326, 138.1; 16/249, 242, 357, 361; 160/199, 206; 296/146 G

[56] References Cited

U.S. PATENT DOCUMENTS

| | | | |
|---|---|---|---|
| 1,180,307 | 4/1916 | Malone et al. | 16/249 |
| 2,882,962 | 4/1959 | Hollansworth | 160/206 XR |
| 3,567,315 | 3/1971 | Speer | 16/242 X |
| 4,547,929 | 10/1985 | Lew et al. | 16/361 X |
| 4,588,096 | 5/1986 | Storey et al. | 280/79.3 X |
| 4,697,711 | 10/1987 | Noren | 280/79.3 X |
| 4,976,450 | 12/1990 | Ellefson | 280/79.11 |

FOREIGN PATENT DOCUMENTS

| | | | |
|---|---|---|---|
| 1159540 | 6/1958 | France | 16/357 |
| 262422 | 10/1990 | Japan | 296/146 |

*Primary Examiner*—David M. Mitchell
*Assistant Examiner*—Gary C. Hoge
*Attorney, Agent, or Firm*—Laff, Whitesel, Conte & Saret

[57] ABSTRACT

The invention is a shock mount for a pivoted door on mobile food service equipment or a rolling cart. The shock mount is preferably a sliding block which is spring biased to a normal position. In case of a shock or jolt, the block slides to dissipate the energy resulting from the shock or jolt. A door is pivotally mounted on the sliding block. Detents hold the door in either a closed position or a supported open position. The pivot mount enables the door to move over the detent, while holding the door in either a closed or a supported open position.

8 Claims, 2 Drawing Sheets

SHOCK MOUNT FOR DOORS

This invention relates to shock absorbing doors especially —although not exclusively—on rolling carts and more particularly to mobile food service equipment which are subject to being bumped by striking other objects.

BACKGROUND OF INVENTION

A rolling cart or mobile food service equipment of the described type may be used in cafeterias or restaurants, for example. These carts may be used to transport trays of food, dirty dishes, or the like. As the carts are rolled around a busy kitchen or dining room, they are likely to bump into any nearby objects. Or perhaps two carts may collide. Possibly a person who is inattentive may run into the cart.

Regardless of why it may happen, the cart is subject to shocks and jolts. The doors on the cart may have either hinges or pins to enable them to swing between opened and closed positions; or, sometimes, the door may hang in any position between being fully open or closed. As the shocks or jolts occur, the pins or hinges may bend or break, especially if the door is standing in a vulnerable position where all of the weight is being carried by the hinge or pin, as distinguished from resting on an underlying surface.

SUMMARY OF INVENTION

Accordingly, an object of the invention is to provide new and improved door mounts which will absorb shocks or jolts without bending or breaking the hinge or other support. Here an object is to provide doors which remain in a stable, fully open or closed position throughout shock causing conditions.

In keeping with these and other objects of the invention, the doors on the cart are supported on the top and bottom by projecting pins which fit into holes in a door sill or mounting blocks. Normally, at least one of the mounting blocks is slidingly supported and held in a fixed position by a spring. When the rolling cart experiences a shock or jolt, the block slides against the bias of the spring in order to absorb the shock. As soon as the shock or jolt condition subsides, the spring bias moves the block back to its normal position.

BRIEF DESCRIPTION OF DRAWINGS

A preferred embodiment is shown in the attached drawing, wherein.

DETAILED DESCRIPTION OF INVENTION

Figure 1:
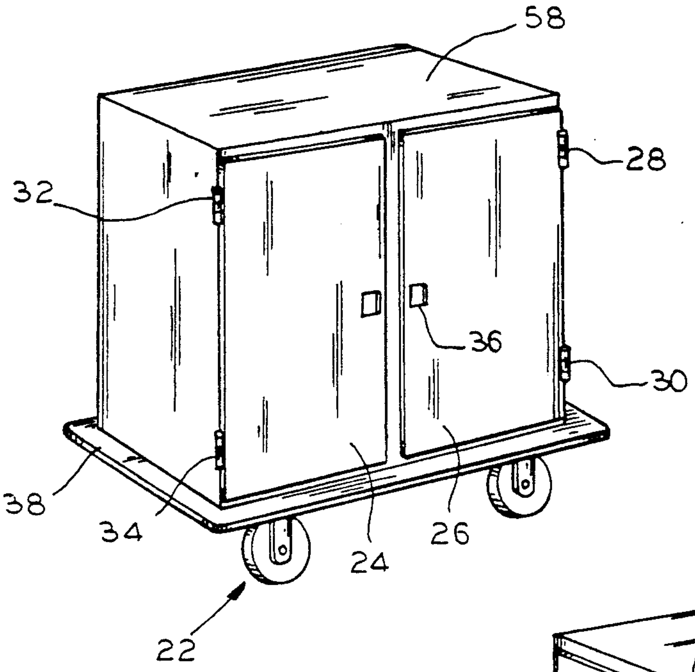
FIG. 1 (PRIOR ART)
FIG. 1 is a prior art rolling cart with its doors shut.

An exemplary rolling cart 20 is mounted on wheels or casters 22 so that it may roll around. In this embodiment, there are two doors 24, 26, each of which is mounted on butt hinges 28–34. The doors may be opened or closed in a locked position by a use of a spring loaded paddle handles 36. The spring in this handle is often broken or jarred out of position.

When the doors are opened (FIG. 2) they may swing around the end of the cart and over a small supporting ledge 38, where they should be latched into place. Ledge 38 is supposed to support the weight of the door in order to relieve the strain on the hinges. Inside the rolling cart, oppositely disposed and vertically aligned supports are positioned to receive trays which may slide into the cart. To facilitate a sliding of trays into and out of the cart, it is desirable to swing the door 270° around the end panel of the cart to fully clear the opening through which the trays may slide.

A problem occurs as the cart rolls because it may strike or be struck by something and stop suddenly with a strong mechanical shock or jolt. The inertia of the door suddenly applies a force to the hinge which may twist the hinge or bend a hinge pin. Also, the projecting butt hinges 28–34 may project outwardly from the side where they may strike or be struck by an object, which might break or twist them.

Still another problem is that a waitress or bus boy might not swing the door all the way around and over ledge 38 so that it is fully supported by ledge 38. Or, if they did so swing the door they might not take enough time to latch it properly in an open position so that it could still swing back and away from the support provided by ledge 38. If the cart or door is struck while the weight of the door is on the hinge, it could bend them.

It should now be apparent that the hinges are probably the most vulnerable parts of the rolling cart.

Figure 3:
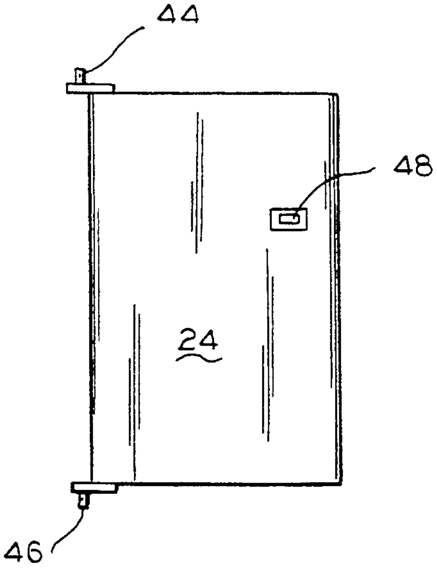
FIG. 3 is an elevation view, showing the hinge pins on a door.

Accordingly, the inventive shock absorbing door 24 (FIG. 3) has upper and lower hinge pins 44, 46, respectively forming a hinge axis. The spring loaded paddle handle 36 has been deleted in favor of a simple non-moving, recessed handle 48 so that broken latch springs are no longer a problem.

Figure 2:
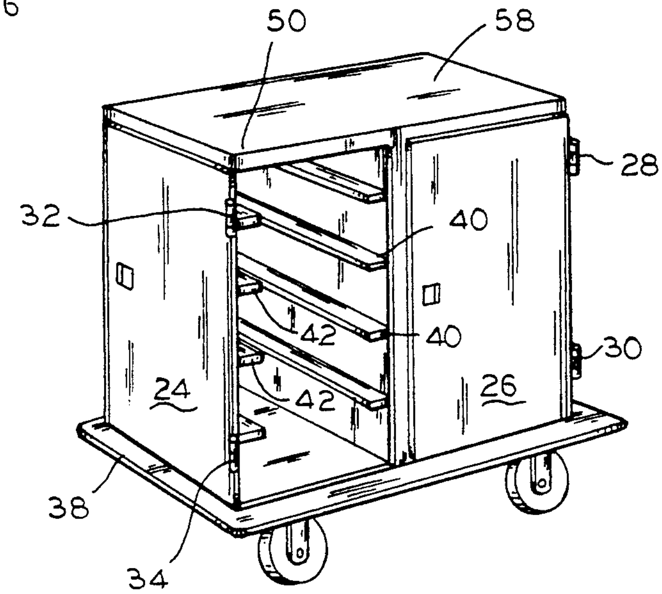
FIG. 2 (PRIOR ART)
FIG. 2 is the prior art rolling cart of FIG. 1 with one of its doors in a fixed open position.
Figure 4:
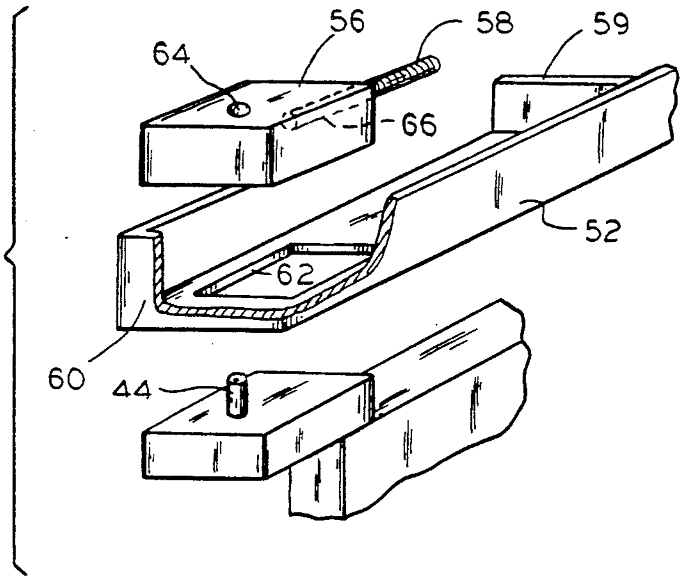
FIG. 4 is an exploded view of a shock absorbing door.

At the upper edge 50 (FIG. 2) of the cart, there is a U-shaped channel member 52 (FIG. 4) which is covered and enclosed by the top panel 54. A sliding block 56, preferably made of a durable plastic such as nylon, has dimensions such that it slides in the channel 52 and is captured within the slot by the top panel 54 (FIG. 2). A compression spring 58 resting on channel partition 59 pushes the block 56 to a normal position against an end panel 60 of the channel 52. The compression spring 58 is resting in a blind horizontal hole 66 in the block 56.

Figure 5:
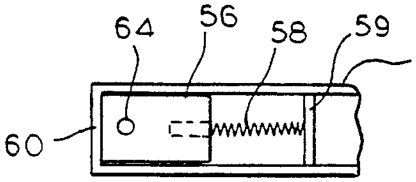
FIGS. 5–7 are stop motion views drawing the shock absorbing action of the device of FIG. 4.

In this position, the hinge pin 44 on the door 24 passes upwardly through a window 62 in the floor of channel 52 and into a hole 64 in the block 56. As shown in FIG. 5, in this normal operating position, the hinge pin is mounted at the edge of the cabinet so that the door may freely swing between an opened and a closed position.

Figure 6:
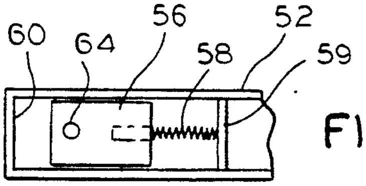

If the cabinet receives a jolt or a shock, the block 56 slides to an OFF normal position, as seen in FIG. 6, compressing the spring 58, in the process. The spring thus absorbs the shock caused energy and the hinge pin is not bent. The window 62 (FIG. 4) is large enough to allow the hinge pin to slide through the full shock absorbing stroke.

Figure 7:
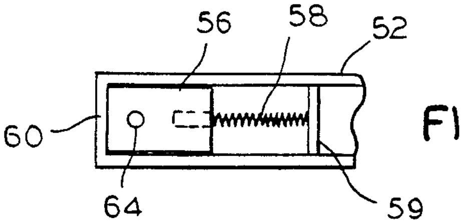

After the shock has ended (FIG. 7), the compression spring 58 pushes the block 56 back to its normal position, and the ability of the door to pivot is returned to its normal position.

Figure 8:
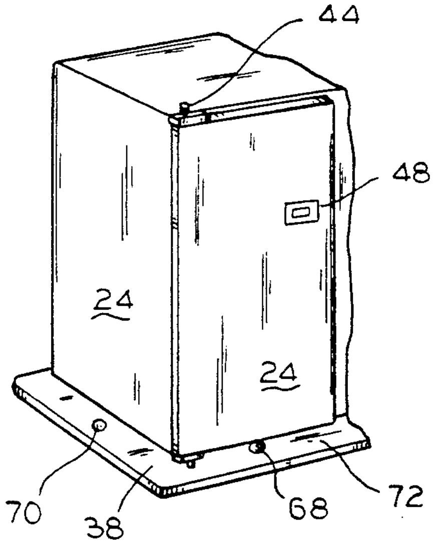
FIG. 8 is a fragment of a rolling cart having the inventive door mounted thereon.
Figure 9:
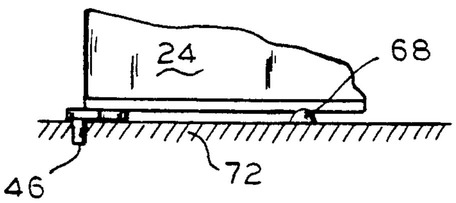
FIG. 9 shows the door in a closed position.
Figure 10:
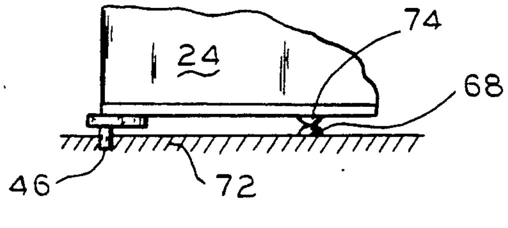
FIG. 10 shows the door as it is swung away from the closed position.

FIGS. 8–10 show how the shock absorbing door may be used to eliminate the need for the spring biased paddle handle, while making it much more likely that a waitress or bus boy will swing and latch the door over the supporting ledge 38.

More particularly, a detent or rounded dome shaped member 68, 70 is mounted on both the door sill 72 and the supporting ledge 38. A simple way of providing these detents is to turn a bolt into a thread hole, the rounded bolt head forming the detent. The bottom of the door 24 has a nylon or similar somewhat dome-shaped wear resistant piece 74 adjacent the detents 68, 70. The lower hinge pin 46 slidingly rests in a stationary hole 76 in door sill 72. The weight of the door makes it rest on the sill 72 and behind the detent. Thus, the weight of the door causes it to be securely latched in place, while leaving it free to undertake any shock caused travel as represented in FIG. 6.

To open the door, it is only necessary to pull the handle 48. There is a natural tendency to slightly lift the door when the handle is pulled. Also, the pull upon the door, and the mutually camming surfaces of detent 68 and dome shaped wear resistant piece 74 causes the door to lift and pass over detent (FIG. 10), and then drop back to the level of the door at the starting position. The reverse happens when the door is closed.

As the door is swung around to confront the end panel 78 (FIG. 8) on the rolling cart, a waitress or busboy may tend to more or less slam the door, which gives it enough inertia to rise over and latch behind detent 70. The more careful person, who simply pushes the door into place, feels a tactile hand sensation when the door raises, as shown in FIG. 10, to pass over detent 68 or 70. Hence, this person will likely soon, learn to push the door into the latched position, either open or closed.

The foregoing description has described the shock mount on the top of the cabinet. However, it should be understood that similar shock mounts can be provided both above and below the door. Also, other arrangements could be provided such as a pivot block 56 which may swing to absorb a shock.

Those who are skilled in the art will readily perceive how to modify the invention. Therefore, the appended claims are to be construed to cover all equivalent structures which fall within the true scope and spirit of the invention.

The claimed invention is:

1. A shock absorbing mount for a door which is pivotally attached to the front of a rolling cart, said rolling cart having a front face, said door being mounted in front of said front face, whereby said door is not protected from mechanically applied jolts and shocks by a confining frame, said shock absorbing door mount comprising a door having upper and lower hinge pins projecting in vertical alignment therefrom in order to form a hinge axis, a hole for receiving the lower hinge pin, said hole being located in front of a door sill on said cart, a channel above the door and attached to the front face of said cart a sliding block in said channel, a hole in said sliding block for receiving said upper hinge pin, and a spring for urging said block into a normal position within said channel responsive to the bias of said spring, the bias of said spring being strong enough to hold said block in said normal position and weak enough to allow said block to move to an off-normal position against the bias of said spring in response to a jolt or shock, the bias of the spring returning the block to said normal position after said jolt or shock subsides.

2. The door mount of claim 1 and a ledge for supporting said door when in an open position, detent means on each of said door sill and said ledge, said detent means being located to capture said door behind said detent, said holes for receiving said hinge pins providing enough vertical play to enable said door to pass over said detent.

3. The door mount of claim 2 and wear resistant means on a bottom of said door at a location which passes over said detents.

4. The door mount of claim 1 and a partition in said channel, a horizontal hole in said block, and said spring means being a compression spring fitting into said horizontal hole and resting against said partition.

5. A rolling cart comprising oppositely disposed and vertically aligned means inside said cart for supporting opposing edges of trays in a stacked array, said rolling cart having a front face, said door being mounted in front of said front face, door means pivotally mounted on said cart for selectively exposing or covering said tray edge support means, said door swinging 270° completely around an end of the cart to enable said trays to enter or leave said cart without obstruction from said door, shock mount door support means attached to a front of said cart for enabling said door to close said cart to cover said tray support means or alternatively to swing into an open position for giving access to said tray support means, and means associated with said shock mount door support means for absorbing a shock inflicted upon said cart without transferring the full energy of said shock to said pivotal mounting of the door wherein said means associated with said door support means comprises a sliding block mounted in a channel over said door, compression spring means positioned to urge said sliding block to a normal position, said shock causing said block to slide to another and OFF-normal position, and means for supporting a pivot point for said door on said sliding block.

6. The cart of claim 5 and means for supporting said door when in a fully open position.

7. The cart of claim 6 and detent means associated with both said opened and closed door positions for holding said door in a latched position, and wear resistant means on said door and adjacent said detent means for absorbing wear upon said door as it passes over said detent.

8. The cart of claim 7 and means responsive to the weight of said door for capture or release of said door, said door support means enabling said door to raise as it passes over said detent.

* * * * *